United States Patent [19]

Murphy et al.

[11] Patent Number: 4,694,953
[45] Date of Patent: Sep. 22, 1987

[54] DRIVE FOR DOUBLE GRIPPER CHAIN CONVEYOR

[75] Inventors: Robert E. Murphy, Utica; Gary R. Ballard, Royal Oak; Rodney D. Kuechenmeister, Utica, all of Mich.

[73] Assignee: Automation Service Equipment, Inc., Warren, Mich.

[21] Appl. No.: 743,736

[22] Filed: Jun. 12, 1985

[51] Int. Cl.$^4$ ............................................. B65G 15/14
[52] U.S. Cl. ................................................... 198/627
[58] Field of Search .............. 74/665 GE; 474/86, 89, 474/114, 115, 117, 140, 148, 200; 198/627, 628, 814, 815, 347, 835

[56] References Cited

U.S. PATENT DOCUMENTS

| | | | |
|---|---|---|---|
| 1,680,843 | 8/1928 | Bechaud | 474/86 |
| 2,696,014 | 12/1954 | Richterbessing | 474/86 X |
| 3,595,369 | 7/1971 | Boulay et al. | 198/627 X |
| 3,841,166 | 10/1974 | Gerberich | 474/140 X |
| 4,328,886 | 5/1982 | Seragnoli | 198/347 |

FOREIGN PATENT DOCUMENTS

929768 7/1948 France .................... 474/86

*Primary Examiner*—Joseph E. Valenza
*Assistant Examiner*—D. Glenn Dayoan
*Attorney, Agent, or Firm*—Rhodes and Boller

[57] ABSTRACT

Each gripper chain assembly is driven by its own headshaft. The headshafts rotate in opposite senses and are powered from a motor/reducer combination. A sheave on the output shaft of the reducer is coupled by one endless belt with a sheave on one of the headshafts, and it is also coupled with a sheave on the other of the headshafts by another endless belt. The one belt is in a non-twisted configuration so that the sheave on the one headshaft rotates in the same sense as the reducer output shaft. The other belt is twisted into a figure eight configuration so that the sheave on the other headshaft rotates in the opposite sense. The two headshafts therefore provide the desired counter-rotation of the two gripper chain assemblies. The motor reducer is mounted on a base plate which is adjustably positionable on the conveyor's frame so as to enable the drive to be adjusted whenever the spacing distance between the two gripper chain assemblies is adjusted for conveying a different sized article. A separator is mounted on the base plate to maintain separation of the twisted drive belt where it crosses itself. In one embodiment the base plate is secured by fasteners, but is adjustably positionable by loosening the fasteners, performing the adjustment, and then retightening the fasteners. In another embodiment the base plate is mounted on guides and biased to maintain tension in the endless belts while allowing its automatic tracking of gripper chain assemblies' adjustment without the need to loosen and retighten fasteners. The bias may be provided by a counterweight or by springs.

14 Claims, 9 Drawing Figures

DRIVE FOR DOUBLE GRIPPER CHAIN CONVEYOR

BACKGROUND AND SUMMARY OF THE INVENTION

This invention relates to conveyors of the type in which the conveyance path is cooperatively defined by and between confronting portions of two endless gripper chain assemblies and in which the two endless gripper chain assemblies operate in opposite senses such that their confronting portions are effective to grip and move articles along the conveyance path. More specifically the present invention relates to an improvement in the drive for this type of conveyor.

Such conveyors are useful in gripping articles of various shapes, such as are common in the bottling, container, and automotive industries. Many of these articles have circular shapes, but such a shape is not essential for usage of this type of conveyor. Conveyors can be constructed in various sizes and configurations; the gripper chain assemblies themselves can fully support the conveyed articles such that no additional means of support is required along the conveyance path.

These conveyors can also be made quite versatile. For example, the direction of conveyance can be reversed simply by reversing the senses in which the two gripper chain assemblies operate.

The particular form for the conveyor which is to be described herein is an elevator-lowerator which is effective to elevate articles when operated in one direction and to lower articles when operated in the opposite direction.

A further example of versatility comprises endowing the conveyor with a means for adjusting the two gripper chain assemblies toward and away from each other so that their confronting portions can be set to a particular distance apart for a particular size of articles to be conveyed. In other words, such a conveyor is capable of conveying different sized articles by simply readjusting the positions of the two endless gripper chain assemblies in relation to each other. In some conveyors it is even possible to make adjustments in the track of the conveyance path.

Drives for double gripper chain conveyors have heretofore comprised either an independent prime mover for each endless gripper chain assembly, or a single prime mover which is coupled to the two endless gripper chain assemblies by a complicated mechanism consisting of various shafts, couplings, universal joints, and sprockets for reversing rotation.

In the case of a drive which utilizes two independent prime movers, measures are often taken to insure that they are synchronized so that the two confronting portions of the gripper chain assemblies travel in unison as they grip and convey articles. Sometimes special synchronizing means are required to achieve this result.

The other type of drive which comprises shafts, couplings, and universal joints is a complicated mechanism requiring a number of individual parts which have to be assembled together.

The present invention is directed to an improvement in the drive for this type of a conveyor, and it possesses significant advantages over the prior drives which were just described.

The invention is especially for a conveyor in which the two gripper chain assemblies are relatively adjustable. The invention eliminates the use of two independent prime movers and the synchronizing means characteristic of the one prior drive, and in the case of the other prior design, the invention eliminates the drive box which comprises the complicated system of shafts, couplings, sprockets, and universal joints.

In a conveyor in which the gripper chain assemblies are adjustable, the invention enables the drive to be adjusted concurrently with the adjustment of the two gripper chain assemblies with at most a loosening of fasteners, a repositioning of the drive, and a retightening of the fasteners. Indeed, in one particular embodiment of the invention the drive automatically tracks the adjustment of the gripper chain assemblies so that there is not even the need to loosen and retighten any fasteners at all.

The invention affords a number of significant advantages over the prior art, and a particularly significant one is the fact that it eliminates the complicated constructions of prior drives. The present invention yields a very significant saving in the cost of the drive which is reflected in a similar saving in the total cost of the conveyor. Moreover, because it eliminates the complexities of the prior drives, the invention is less prone to operating problems, and if maintenance or repair is needed, the present invention enables same to be more conveniently and economically performed.

Briefly, the preferred embodiment of the invention comprises an electric motor operating through a reducer to drive the two gripper chain assemblies. The reducer is coupled with the respective gripper chain assemblies by sheaves and drive belts. The drive is mounted on a base plate which is itself adjustably positionable on the conveyor's frame so that when the gripper chain assemblies are adjusted on the frame, there can be a similar adjustment of the drive base plate on the frame but without the need to make any other changes in the drive. At most, all that may be required is an unloosening of fasteners which fasten the base plate to the frame to enable the adjustment to be performed, and then a retightening of those fasteners after the desired adjustment has been obtained. In another embodiment there is not even any need to loosen and retighten fasteners because in this other embodiment, the base plate automatically tracks the adjustment of the gripper chain assemblies whenever the gripper chain assembly adjustment is performed.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
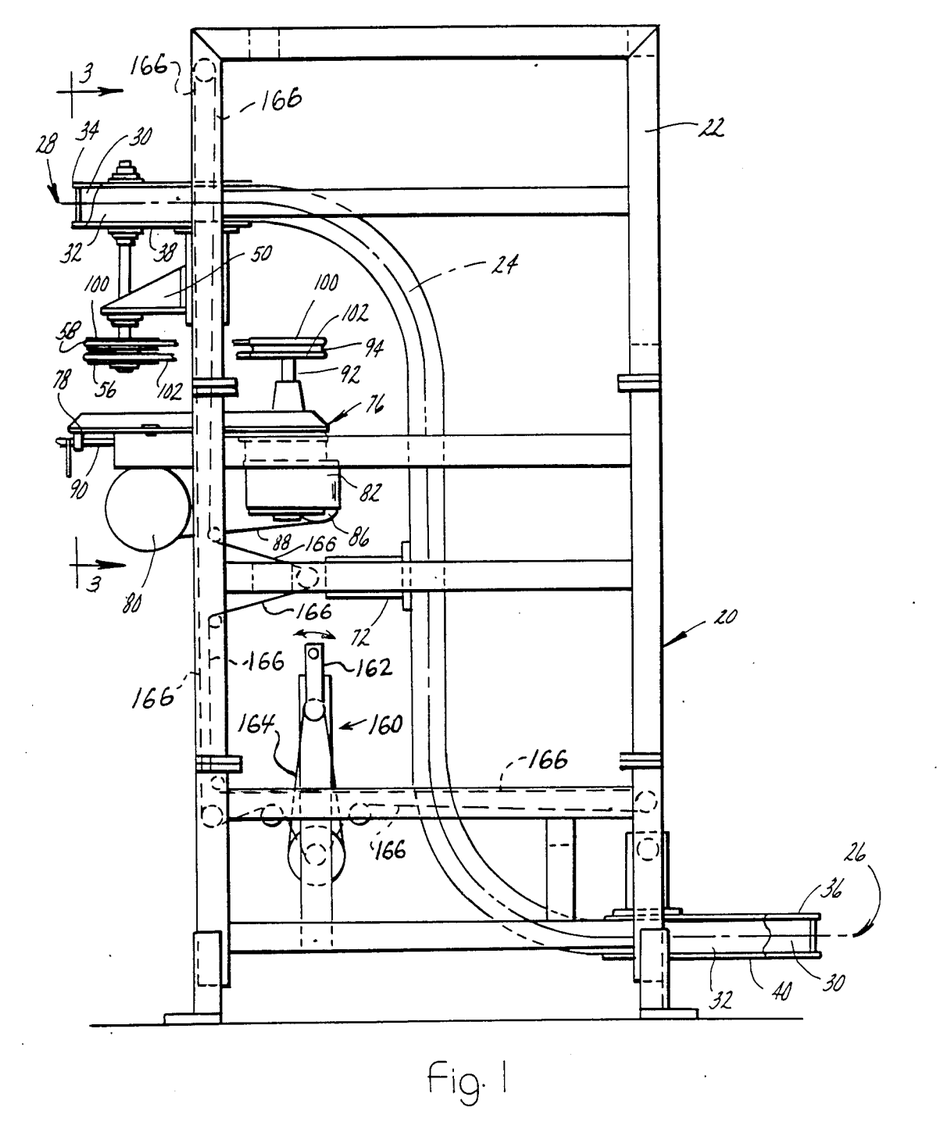
FIG. 1 is a front elevational view of an elevator-lowerator type conveyor embodying principles of the present invention, with certain portions broken away for clarity of illustration.

FIG. 1 illustrates principles of the invention in an elevator-lowerator type conveyor which is designated by the general reference numeral 20. Conveyor 20 is illustrated in a floor-mounted configuration which comprises a generally rectangular upright framework 22.

The center line of the conveyance path is designated by the broken line 24. When conveyor 20 operates as an elevator, conveyed articles enter at 26, are conveyed along path 24, and exit at 28. When the conveyor is operated as a lowerator, conveyed articles enter at 28, are conveyed along path 24 and exit at 26.

Figure 2:
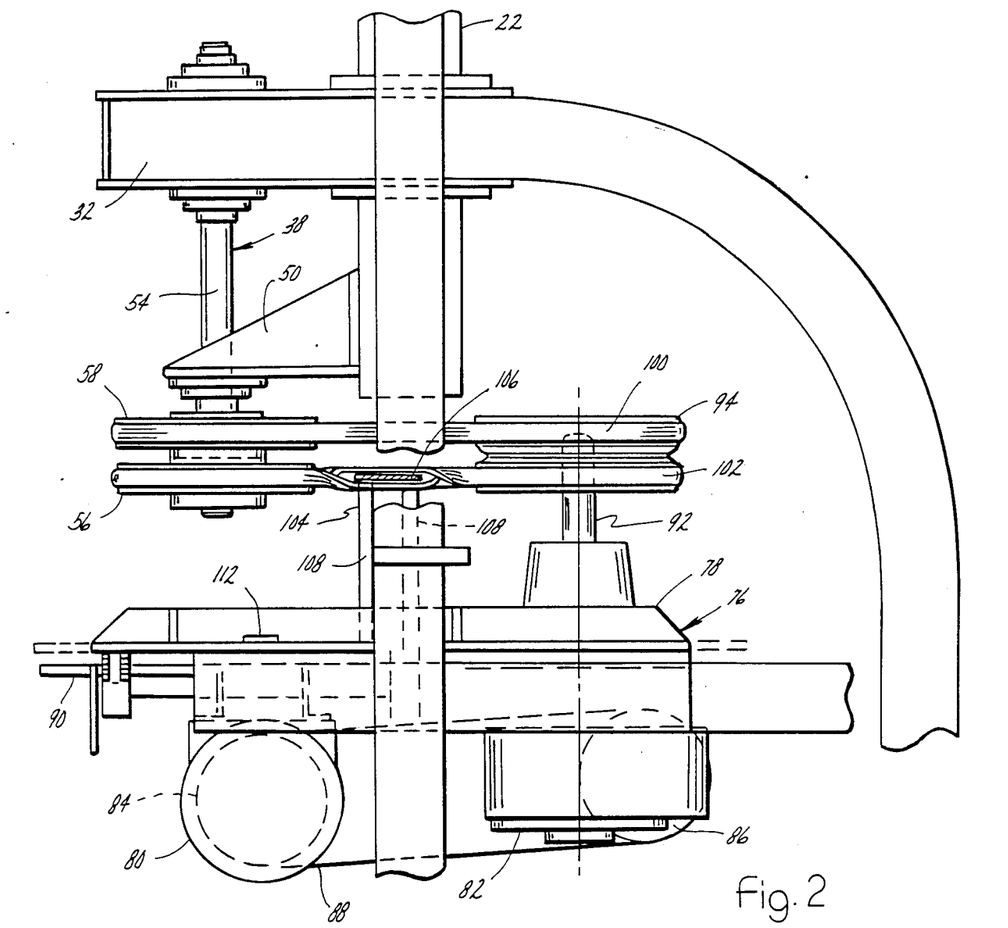
FIG. 2 is an enlarged view of a portion of FIG. 1 looking in the same direction.
Figure 3:
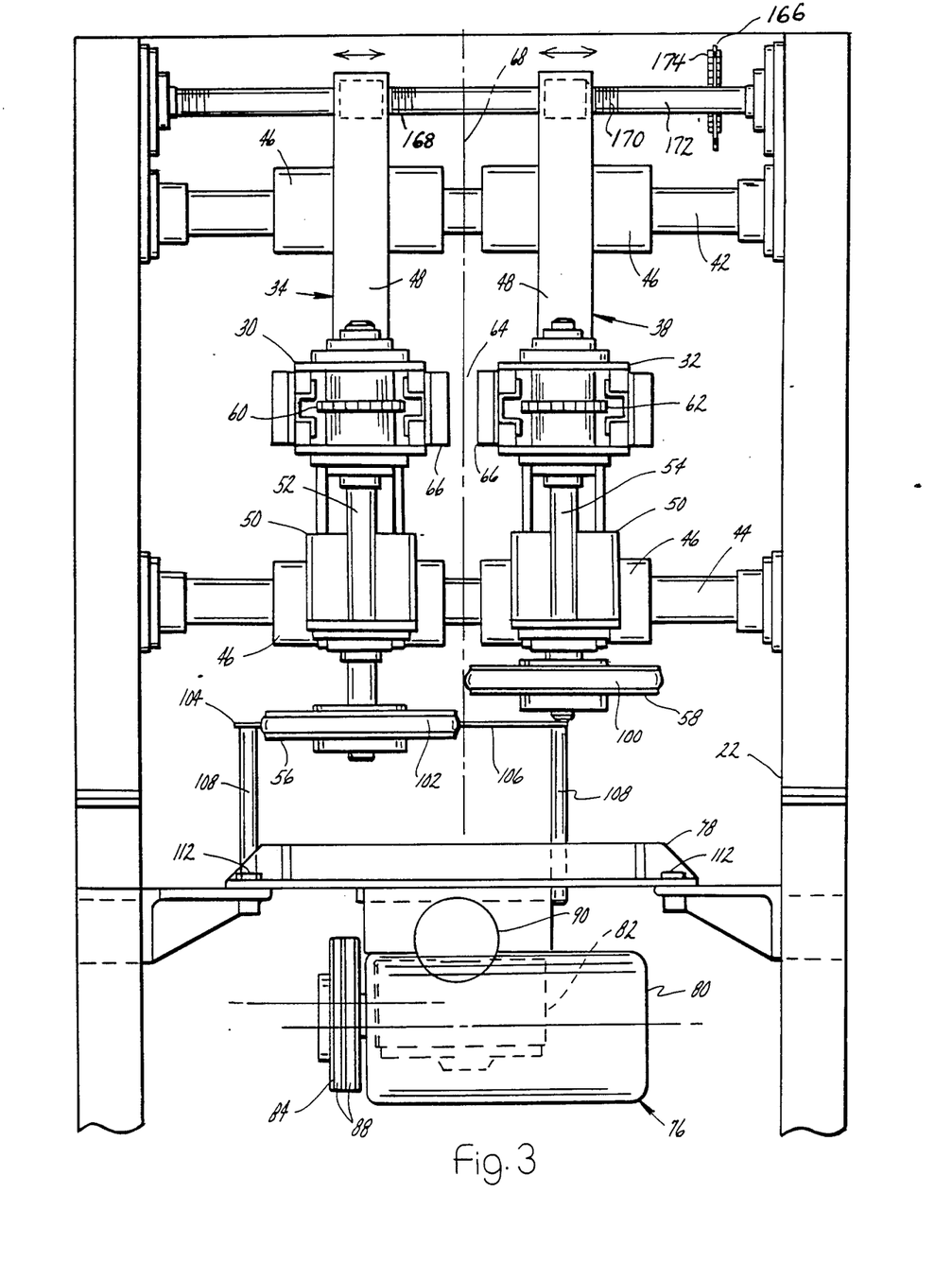
FIG. 3 is an enlarged fragmentary view looking in the direction of arrows 3—3 in FIG. 1, and also corresponds to a left side elevational view of FIG. 2.
Figure 4:
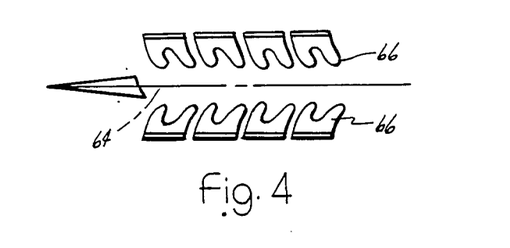
FIG. 4 is a enlarged fragmentary view illustrating a detail, as viewed in plan.

Referring also to FIGS. 2, 3, and 4, conveyor 20 comprises a pair of endless gripper chain assemblies 30 and 32 which are arranged side-by-side along path 24. In the illustrated embodiment the two endless gripper chain assemblies are identical.

Each gripper chain assembly 30, 32 is cooperatively associated with a corresponding headshaft assembly and a corresponding take-up assembly. For gripper chain assembly 30, the corresponding headshaft assembly is identified by the reference numeral 34, and the corresponding take-up assembly by the reference numeral 36. For gripper chain assembly 32, the corresponding headshaft assembly is identified by the reference numeral 38, and the corresponding take-up assembly by the reference numeral 40.

The two headshaft assemblies 34, 38 are supported on framework 22 by means of a pair of vertically spaced apart, horizontally extending parallel guides 42 and 44 whose opposite ends are attached to the framework 22. The two take-up assemblies 36 and 40 are supported on the framework in a similar manner.

Each headshaft assembly 34, 38 comprises a pair of bushings 46 which engage the two guides 42, 44. Each headshaft assembly further comprises a body portion 48 which is joined to and extends between its two bushings 46.

A braced bracket 50 projects from each body portion 48 adjacent the lower end thereof to support a corresponding headshaft. The headshaft for headshaft assembly 34 is designated by the reference numeral 52, and the one for headshaft assembly 38 by the reference numeral 54. The two headshafts are arranged with their axes vertical.

A sheave 56 is affixed to the lower end of headshaft 52, and a sheave 58 is affixed to the lower end of headshaft 54. The two headshafts 52, 54 are of different lengths, and the two sheaves 56, 58 are vertically offset from each other, sheave 56 being lower in this particular conveyor.

A sprocket 60 is affixed to the upper end of headshaft 52, and a sprocket 62 is affixed to the upper end of headshaft 54. Sprockets 60, 62 are respectively engaged with the respective gripper chain assemblies 30, 32.

Each take-up assembly 36, 40 comprises a sprocket on a vertical shaft, and each gripper chain assembly 30, 32 extends between the corresponding headshaft sprocket and the corresponding take-up sprocket. The sprockets are identical.

Therefore, this arrangement provides for the two gripper chain assemblies to have respective portions which confront each other across a uniform gap 64 (see FIG. 3) which extends along the length of the conveyance path. By operating the two gripper chain assemblies in opposite senses, these two confronting portions of the two gripper chain assemblies travel along the conveyance path in unison. An article which is placed between them is gripped and carried along the conveyance path.

Referring also to FIG. 4 it can be seen that the construction of a representative gripper chain assembly includes a series of fingers 66 which serve to grip the conveyed articles. The fingers are sufficiently stiff, slightly resiliently compressible and/or deflectable to provide for satisfactory gripping. In this regard the gripping forces acting upon the conveyed articles may be sufficient to provide full support for the conveyed articles such that any additional means of support for the articles is not required. This would be representative of the construction of many typical conveyors of this type. Reversal in the respective directions of rotations of the two gripper chain assemblies is effective to reverse the flow direction, and therefore the conveyor can operate either as an elevator or as a lowerator, in the manner described earlier.

While certain conveyors may be designed to have a nonadjustable distance between the confronting portions of their two gripper chain assemblies, many conveyor designs have an adjustment mechanism for adjustably positioning the two gripper chain assemblies so as to thereby adapt the conveyor for use in handling different sized articles. The mounting of the two headshaft assemblies 34, 38 on guides 42, 44 is intended to provide for adjustment of the spacing distance between the two gripper chain assemblies.

FIG. 3 illustrates what perhaps may be considered as a minimum spacing distance wherein the two headshaft assemblies are equally distant from a central vertical plane identified by the reference numeral 68. By moving the two headshaft assemblies outwardly on guides 42, 44, the spacing distance is increased.

The mounting of the take-up assemblies in an analogous fashion provides for their adjustment in the same manner as the headshaft assemblies. Usually the adjusting mechanism is such that the adjustment of one gripper chain assembly is accompanied by a symmetrically opposite adjustment of the other whereby the two remain equally distant from vertical plane 68 for all positions of adjustment. A typical adjusting mechanism (to be described in more detail later) comprises a screw and nut for each headshaft and take-up assembly which are operated in unison from a single hand crank.

Depending upon the overall dimensions of any particular conveyor there may or may not be one or more additional intermediate supports for the gripper chain assemblies along the length of the conveyance path. FIG. 1 illustrates an intermediate support for the illustrated conveyor, and this is designated by the general reference numeral 72. The support is mounted on suitable guides so as to allow for its adjustment whenever the spacing distance between the two gripper chain assemblies is adjusted.

For operating the two gripper chain assemblies 30, 32, a drive mechanism is mounted on frame 22 and operatively coupled with the two headshaft assemblies 34, 38. The drive is designated by the general reference numeral 76 and comprises a mounting plate, or base plate, 78 which is supported on framework 22 in a generally horizontal manner.

Mounted on base plate 78 are a conventional electric motor 80 and a conventional speed reducer 82. Motor 80 and speed reducer 82 comprises respective double-grooved sheaves 84 and 86 which are coupled together by a pair of endless belts 88. The motor mounting includes an adjusting mechanism 90 to provide for desired tensioning of belts 88.

The output shaft of the speed reducer is designated by the reference numeral 92 and the speed reducer is so arranged that output shaft 92 projects vertically upwardly. The axis of shaft 92 lies within plane 68. The multi-grooved sheave 94 is affixed to output shaft 92. One of the grooves 96 of sheave 94 is disposed at the same elevation as sheave 58 while another of the grooves 98 of sheave 94 is disposed at the same elevation as sheave 56.

An endless belt 100 extends between groove 96 and sheave 58 while an endless belt 102 extends between groove 98 and sheave 56. The manner in which these two belts are looped appears in FIG. 5.

The operative coupling of sheave 94 with sheave 58 is such that rotation of drive shaft 92 in one sense produces rotation of sheave 58 in the same sense.

Figure 5:
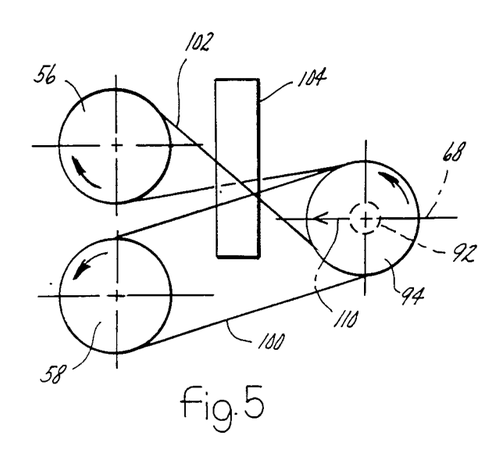
FIG. 5 is a plan schematic view useful in illustrating certain principles of the invention.

Belt 102 is however twisted into a "figure eight" configuration as viewed in FIG. 5 whereby sheave 56 will be caused to rotate in the opposite sense from sheaves 94 and 58. This is done to produce the desired counter-rotation of the two headshafts so that the two endless gripper chain assemblies 30, 32 travel in opposite senses about their respective headshaft and take-up assemblies to yield the proper conveyor action. By making sheaves 94, 58 and 56 the same diameter, the drive produces equal travel speeds for the two endless gripper chain assemblies 30, 32.

In order to avoid undesired rubbing of belt 102 where it crosses itself, a separator 104 is provided. This separator is disposed on base plate 78 to provide a separation between the two segments of the drive belt which would otherwise rub against each other. Separator 104 comprises a flat rectangular plate 106 whose length extends generally parallel to the direction of adjustment of the headshaft assemblies, (i.e. parallel to guides 42, 44) and it is supported in an upright manner on base plate 78 by means of four posts 108 at the four corners. As belt 102 passes between the corresponding two sheaves, one part of the belt passes over the separator plate while the other part passes beneath the separator plate. While the separator plate will in fact be rubbed by either or both of the crossed belt segments which it separates, a suitable selection of materials will minimize any serious propensity toward wear of the belt.

FIG. 5 illustrates schematically the positions of sheaves 56, 58, and 94 which may be deemed to correspond to that shown by FIGS. 2 and 3. If the spacing distance between the two gripper chain assemblies is to be increased, base plate 78 is repositioned on framework 22 in a horizontal direction 110 which is perpendicular to the direction of adjustment of the two drive belts. Hence the axis of shaft 92 and sheave 94 remains in plane 68.

Figure 6:
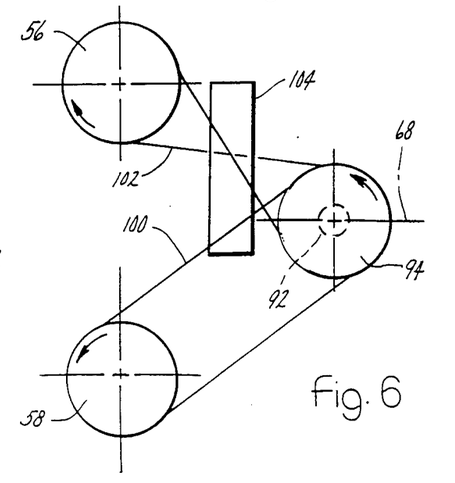
FIG. 6 is a plan schematic view similar to FIG. 5 illustrating an alternate position.

FIG. 6 shows the result where such an adjustment has been made. The adjustment of base plate 78 and hence of the drive, in the direction of arrow 110 has moved the axis of shaft 92 and sheave 94 closer to the vertical plane which passes through the axes of the two headshafts as the two headshafts have themselves been moved farther apart from each. Therefore, the drive can be conveniently adjusted on the conveyor's framework to accommodate the adjustment of the two headshaft assemblies on framework 22. There is no need to change belts since the adjustment of the shaft 92 takes place in vertical plane 68 on each side of which the two headshafts are symetrically disposed.

When the conveyor is in use, base plate 78 is secured on framework 22 by fasteners 112. The base plate comprises elongated slots parallel to arrow 110 through which fasteners 112 pass. These fasteners are loosened when adjustment of the base plate is to be made and are retightened afterwards. The elongated slots allow the adjustment to be performed.

Figures 7, 9:
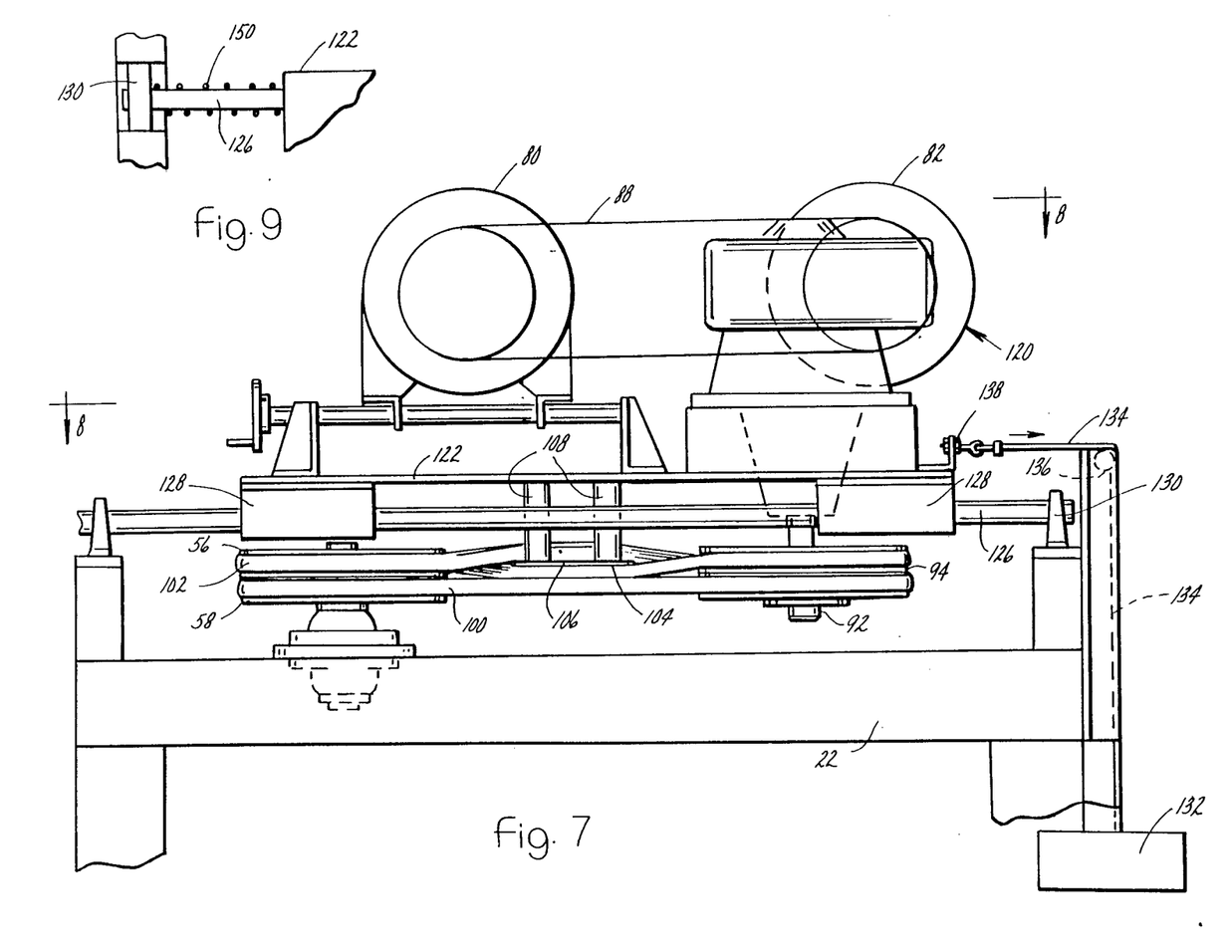
FIG. 7 is a partial front elevational view illustrating another embodiment.
FIG. 9 is a fragmentary view illustrating a modification.
Figure 8:
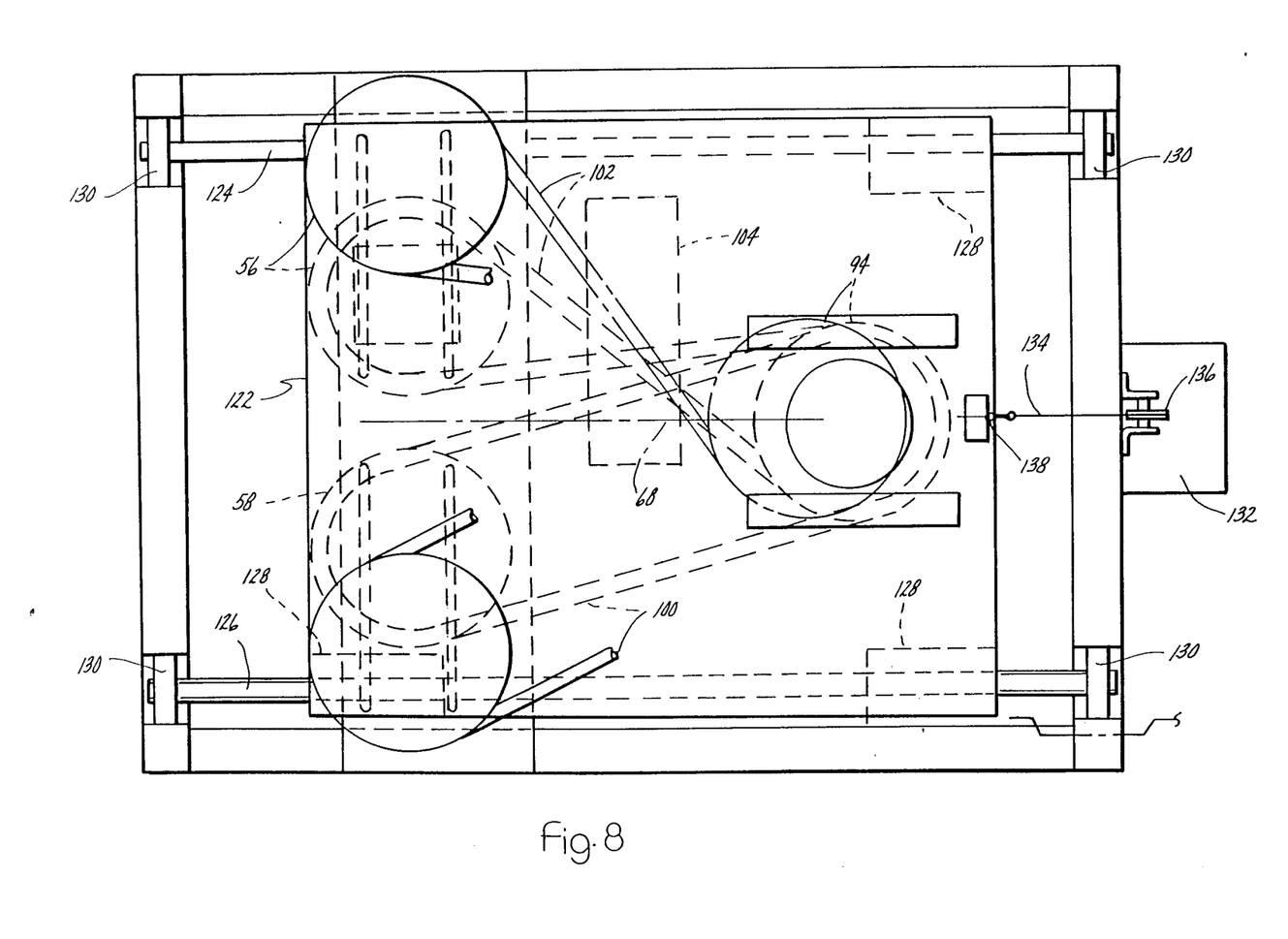
FIG. 8 is a top plan view of FIG. 7, as taken substantially in the direction of arrows 8—8 in FIG. 7.

FIGS. 7 and 8 illustrate an alternate embodiment of drive 120 which possesses the same general principles as drive 76. The drive of FIGS. 7 and 8 may be considered as an overhead drive and is shown atop framework 22. The overhead drive is disposed at a level above the two headshaft assemblies whereas drive 76 is disposed below them. Like components of drives 76 and 120 are identified by the same reference numerals, and therefore the drive of FIGS. 7 and 8 comprises a motor 80, a speed reducer 82, belts 88, sheave 94 and belts 100, 102.

Instead of sheaves 56 and 58 being on the lower ends of the respective headshafts, the headshafts in FIGS. 7 and 8 are extended upwardly and the two sheaves 56 and 58 are on the upper ends of the respective headshafts. The two sheaves are however still vertically offset.

The base plate on the drive of FIGS. 7 and 8 is identified by the reference numeral 122, and it differs in certain respects from base plate 78. The reducer and motor are mounted on the top of base plate 122 but with the reducer output shaft 92 projecting downwardly. There is still the adjustment for tensioning belts 88.

The base plate 122 is supported along its sides on a pair of spaced apart, horizontally extending, parallel guides 124, 126. The base plate contains bushings 128 which engage the guides, and the guides are in turn supported at their ends on supports 130 on framework 22. With this arrangement the drive can be positioned along the length of the guides.

The drive of FIGS. 7 and 8 further differs from drive 76 in that base plate 122 has the ability to automatically track adjustment of the two headshaft assemblies. In other words the base plate is not locked on the guides 124, 126. Rather, it is continuously biased by a horizontal force acting parallel to the direction of the guides so that the two belts 100, 102 are always suitably tensioned. In the illustrated embodiment this horizontal force is delivered by means of a counterweight 132 and cable 134.

Counterweight 132 is suspended to one side by cable 134. The cable is trained around a pulley 136 on framework 22 and attaches to base plate 122 at 138. The force of gravity acting upon the counterweight produces a downward force on the cable which is translated via pulley 136 into a horizontal force acting on the base plate.

Whenever there is an adjustment to increase the spacing between the two headshaft assemblies, the belts 100, 102 will pull on sheave 94 to cause base plate 122 to travel along guides 124, 126 (to the left in FIGS. 7 and 8), elevating the counterweight in the process. Similarly when the adjustment is in the opposite direction, the counterweight will be effective to move the base plate in the opposite direction (to the right in FIGS. 7 and 8). In this way belts 100, 102 remain engaged with the sheaves during the adjustment process to automatically track any adjustments which are made. The counterweight is made sufficiently large to produce the desired belt tension but without introducing too high an effort into the adjustment of the headshaft assemblies.

Thus drive 120 is automatically adjusted by the adjustment of the headshaft assemblies without any need to loosen or retighten the base plate on the frame.

Although the embodiment of FIGS. 7 and 8 has illustrated this self-tracking ability in an overhead drive, it will be appreciated that such an automatic tracking capability can be embodied in an underdrive arrangement, such as that illustrated by FIGS. 2 and 3.

FIG. 9 illustrates a modification which replaces the counterweight and cable biasing system with a spring-biased system. Suitable springs 150 are disposed around the guides 124, 126 and act to urge the base plate to the right.

The adjusting mechanism 160 for adjusting the spacing distance between the two gripper chain assemblies comprises a hand crank 162. Hand crank 162 operates a first endless chain 164 which in turn operates a second chain 166. The latter chain engages sprockets associated with the headshaft assemblies, take-up assemblies and any intermediate supports. There are also a number of idler sprockets for chain 166.

FIG. 3 depicts a means for moving the two headshaft assemblies in opposite senses comprising oppositely threaded screw portions 168, 170 on a shaft 172 containing a sprocket 174 connected with chain 166. Each headshaft assembly comprises a nut which travels on the corresponding screw portion. Hence rotation of the shaft by chain 166 acting on sprocket 174 causes the two headshaft assemblies to move in opposite senses. Similar mechanisms adjust the take-up assemblies and intermediate supports.

It is to be appreciated that principles of the invention are adaptable to many different specific conveyor designs. The illustrated elevator-lowerator is exemplary of one type. Likewise the details of construction are also merely representative. Various forms of drive belts, drive chains, sprockets, sheaves, etc. may be utilized in conveyors embodying principles of the invention. In order to handle a larger load, a multigrooved construction could be provided for each sheave 58, 56 along with plural belts for each accompanied by a corresponding increase in the number of grooves in the reducer shaft output sheave. Therefore while a preferred embodiment of the invention has been disclosed, it will be appreciated that principles of the invention are applicable to other embodiments.

What is claimed is:

1. In a conveyor for conveying articles along a conveyance path which is cooperatively defined by and between confronting portions of two endless gripper chain assemblies operated in unison in opposite senses by a drive such that said confronting portions grip and convey articles along the conveyance path, the improvement which comprises said drive comprising a pair of shafts each of which constitutes an input to a corresponding one of said two gripper chain assemblies, a power output shaft, and coupling means for operatively coupling said power output shaft with said pair of shafts for causing said pair of shafts to rotate in opposite senses and thereby similarly operate said gripper chain assemblies, said coupling means comprising a non-twisted endless drive member between said power output shaft and one of said pair of shafts in an operative arrangement such that rotation of said power output shaft in one sense causes said one of said pair of shafts to rotate in the same sense and said coupling means comprising a twisted endless drive member between said power output shaft and the other of said pair of shafts in an operative arrangement such that rotation of said power output shaft in said one sense causes the other of said pair of shafts to rotate in the opposite sense, and in which the endless gripper chain assemblies of the conveyor are relatively adjustably positionable toward and away from each other and said pair of shafts are correspondingly relatively adjustably positionable toward and away from each other in accordance with the adjustable positioning of said endless gripper chain assemblies, in which said power output shaft is adjustably positionable in correlation with the relative positioning of said pair of shafts to maintain said drive members in operative arrangement with said pair of shafts for different adjustment positions of said endless gripper chain assemblies with respect to each other, and in which the axes of said pair of shafts and of said power output shaft are parallel with each other and the axis of said power output shaft is disposed in a plane which is equidistant from the axes of said pair of shafts, and said pair of shafts are adjustably positionable toward and away from each other within a common plane which is perpendicular to said central plane, and the axis of said power output shaft is adjustably positionable within said central plane toward and away from said common plane.

2. The improvement set forth in claim 1 in which said endless drive members are drive belts, and including sheaves on said pair of shafts and said power output shaft with which said drive belts are operatively engaged.

3. The improvement set forth in claim 2 in which said sheaves are all of the same diameter.

4. The improvement set forth in claim 1 further including biasing means for exerting a bias force on said power output shaft so as to urge said power output shaft in a sense away from a plane containing the axes of said pair of output shafts and thereby maintain said drive belts in operative engagement with said sheaves during adjustment of positioning said endless gripper chain assemblies relative to each other.

5. The improvement set forth in claim 4 in which said bias means comprises counterweight means.

6. The improvement set forth in claim 4 in which said bias means comprises spring means.

7. The improvement set forth in claim 1 in which said drive comprises a motor and a reducer mounted on a base plate, said motor being operatively coupled to drive said reducer, said reducer having an output shaft which constitutes said power output shaft, and in which said base plate is adjustably positionable on the conveyor to adjustably position said power output shaft.

8. The improvement set forth in claim 2 in which the axes of said pair of shafts and of said power output shaft are disposed vertically on the conveyor.

9. The improvement set forth in claim 1 including sheaves of equal diameters on said pair of shafts and said power output shaft, said endless drive member providing operative coupling from a sheave on said power output shaft to a sheave on said one of said pair of shafts, and said twisted endless drive member providing operative coupling of a sheave on said power output shaft with a sheave on said other of said pair of shafts.

10. The improvement set forth in claim 9 in which said power output shaft is disposed on a base plate which is adjustably positionable on the conveyor to adjust the position of said power output shaft in relation to said pair of shafts, and including a separator on said base plate for maintaining separation of those portions of said second endless drive member at the point where they cross each other.

11. The improvement set forth in claim 10 including bias means for forcefully biasing said base plate in a direction away from a plane which contains the axes of said pair of shafts.

12. The improvement set forth in claim 11 in which said drive includes a motor and a reducer mounted on said base plate, and means operatively coupling the motor and reducer such that the motor operates via the reducer to operate said power output shaft, said reducer having an output shaft constituting said power output shaft.

13. The improvement set forth in claim 12 in which said base plate has top and bottom surfaces disposed to be generally horizontal, and said motor and reducer are mounted on one of said surfaces of said base plate, said separator being disposed on the other of said surfaces of said base plate.

14. The improvement set forth in claim 13 including a pair of spaced apart, parallel guides on the conveyor on which said base plate is guided for adjustable positioning toward and away from the plane containing the axes of said pair of shafts.

* * * * *

UNITED STATES PATENT AND TRADEMARK OFFICE
CERTIFICATE OF CORRECTION

PATENT NO. : 4,694,953
DATED : September 22, 1987
INVENTOR(S) : Robert E. Murphy, et al It is certified that error appears in the above-identified patent and that said Letters Patent are hereby corrected as shown below:

At column 8, line 51 (claim 4, line 5 of the claim) delete "output";

At column 9, line 3 (claim 9, line 3 of the claim) between "said" and "endless", insert --non-twisted--.

Signed and Sealed this

Twenty-ninth Day of March, 1988

Attest:

DONALD J. QUIGG

*Attesting Officer*  *Commissioner of Patents and Trademarks*